United States Patent [19]

Swenson et al.

[11] 4,181,357
[45] Jan. 1, 1980

[54] SEAT BACKREST TILT AND HEIGHT ADJUSTMENT MEANS

[75] Inventors: Richard F. Swenson, Milwaukee; Shawn H. Eimen, Menomonee Falls; John J. Gryga, Jr., Milwaukee; Gerard E. Schommer, Menomonee Falls, all of Wis.

[73] Assignee: Milsco Manufacturing Company, Brown Deer, Wis.

[21] Appl. No.: 888,555

[22] Filed: Mar. 20, 1978

[51] Int. Cl.$^2$ .................. A47C 1/022; A47C 1/025
[52] U.S. Cl. .................................. 297/353; 297/358; 297/362
[58] Field of Search ............... 297/362, 361, 355, 353, 297/358

[56] References Cited

U.S. PATENT DOCUMENTS

| | | | |
|---|---|---|---|
| 2,565,867 | 8/1951 | Lundquist | 297/358 |
| 3,397,912 | 8/1968 | Bush | 297/355 |
| 3,667,804 | 6/1972 | Yasui et al. | 297/362 |
| 3,673,891 | 7/1972 | Pickles | 297/362 X |
| 3,814,475 | 6/1974 | Slabon et al. | 297/361 |

FOREIGN PATENT DOCUMENTS

| | | |
|---|---|---|
| 2028723 | 12/1971 | Fed. Rep. of Germany ............ 297/362 |
| 2604489 | 8/1976 | Fed. Rep. of Germany ............ 297/362 |
| 1324973 | 3/1963 | France .................................. 297/353 |

*Primary Examiner*—William E. Lyddane
*Attorney, Agent, or Firm*—James E. Nilles

[57] ABSTRACT

A vehicle seat comprises a seat assembly including a seat pan, a backrest assembly including a backrest pan, a backrest height adjustment mechanism connected between the seat pan and the backrest pan and including a height adjustment knob, and a backrest tilt adjustment mechanism connected between the seat pan and the backrest pan and including a tilt adjustment knob. The backrest pan can be tilted regardless of its vertical position relative to the seat pan and can be moved vertically regardless of its tilted position relative to the seat pan. The tilt adjustment mechanism further includes a connector assembly connected to and tiltable in response to rotation of the tilt adjustment knob and including a pair of relatively slideable connector members, one of the connector members being connected to the tilt adjustment knob and the other of the connector members being connected to the backrest pan. The height adjustment mechanism and the tilt adjustment mechanism include means to limit vertical and tilting movement, respectively, of the backrest pan.

8 Claims, 23 Drawing Figures

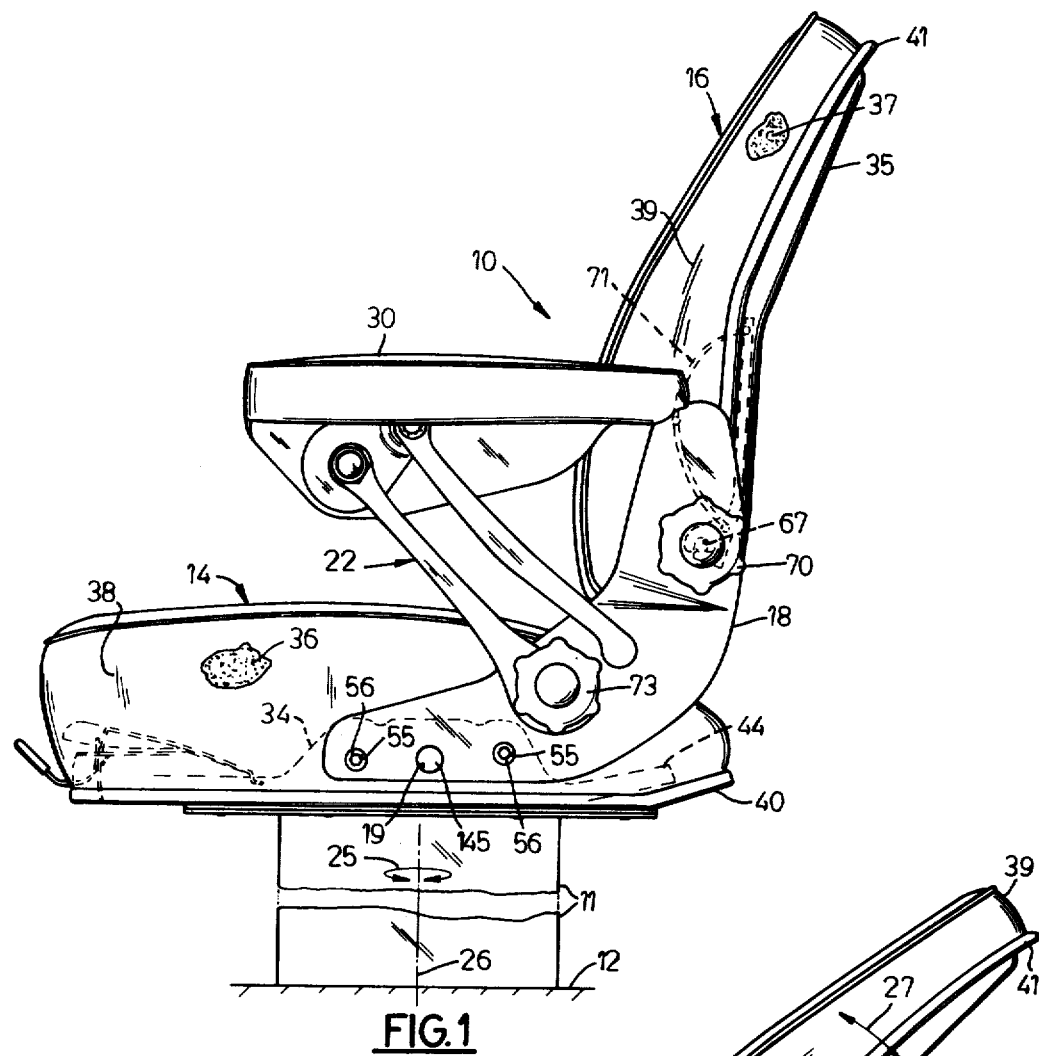

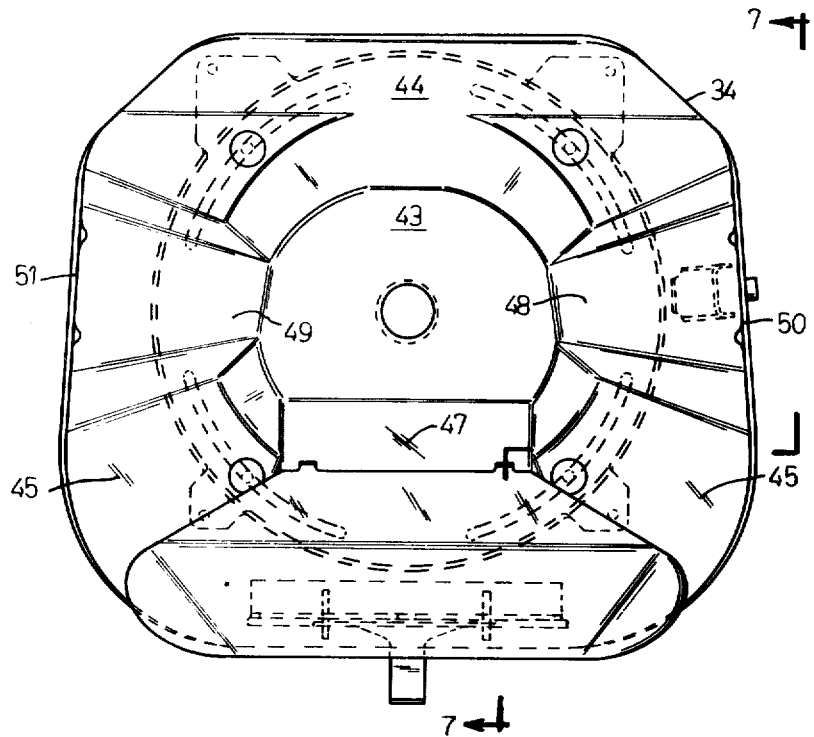
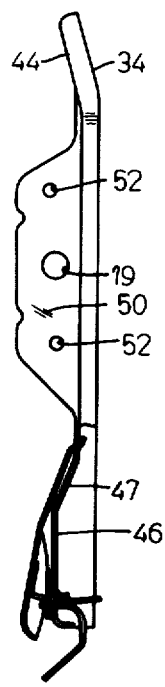
FIG. 6   FIG. 7
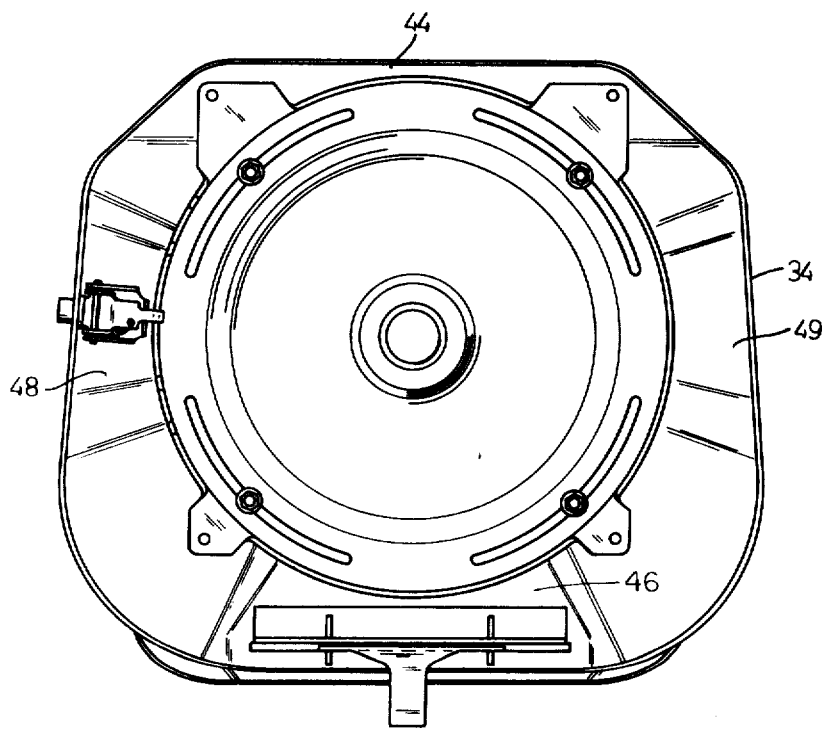
FIG. 5

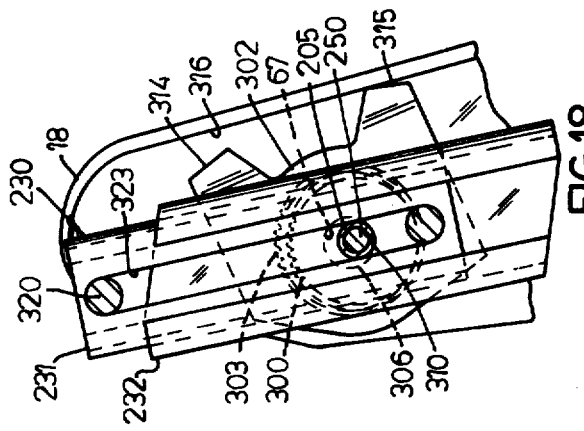
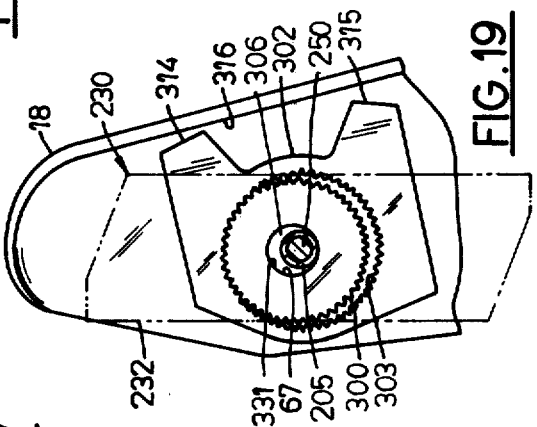
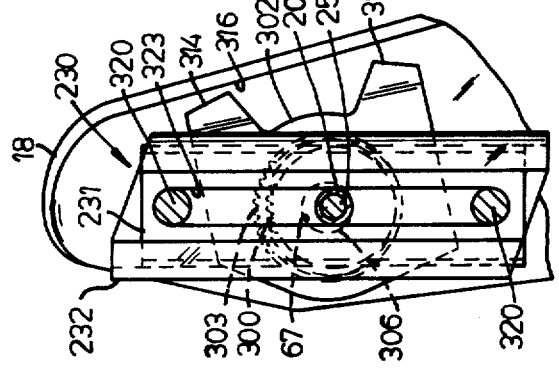
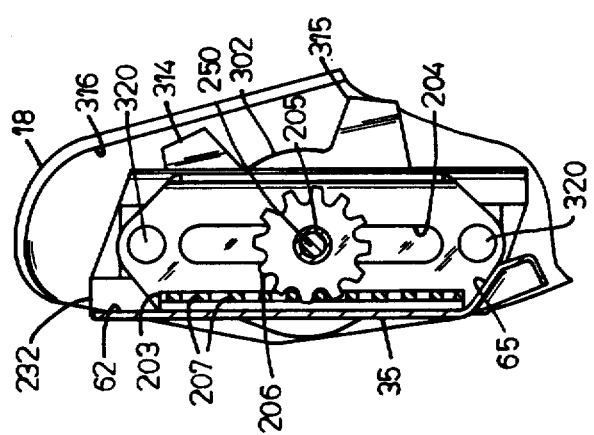

SEAT BACKREST TILT AND HEIGHT ADJUSTMENT MEANS

BACKGROUND OF THE INVENTION

1. Field of Use

This invention relates generally to vehicle seats such as are used as driver's or operator's seats on vehicles such as farm tractors, construction machines, or the like. In particular, it relates to vehicle seats having backrest tilt adjustment means.

2. Description of the Prior Art

Some vehicle seats comprise a seat assembly and an attached backrest assembly and are constructed so as to be mountable either on the floor or on a floor-mounted pedestal in the driver's compartment or station on the vehicle. Heretofore, many such seats had a backrest assembly which was permanently mounted in fixed position. However, the prior art discloses a variety of vehicle seats having tiltably adjustable backrest assemblies. In some prior art tilt adjust mechanisms, the mechanism permitting or effecting tilting is separate and distinct from the locking mechanism which holds the backrest assembly in a position into which it is tilted, thereby requiring an undue number of relatively complex parts.

SUMMARY OF THE INVENTION

In accordance with the present invention, there is provided a vehicle seat which comprises a seat assembly having a seat pan, a backrest assembly having a backrest pan, and a pair of laterally spaced apart connector plates connected to opposite lateral sides of the seat pan. Backrest height adjustment means are connected between one of said connector plates and said backrest pan; and backrest tilt adjustment means are connected between the other of said connector plates and said backrest pan. The backrest pan is tiltable regardless of its vertical position relative to said seat pan and is movable vertically regardless of its tilted position relative to said seat pan. The backrest height adjustment means includes at least one bracket connected to said backrest pan and comprising a vertical track and a vertical slot, a rotatable height adjustment knob located at said one connector plate for effecting vertical movement of said backrest pan relative to said seat pan. The height adjustment means further includes a control rod extending through said vertical slot in said bracket and rotatable in response to rotation of said height adjustment knob and having a sprocket thereon engageable with said vertical track on said bracket. The backrest height adjustment means further comprises a first spur gear connected to said control rod, a first ring gear connected to said one connector plate and having internal teeth engaged with said first spur gear, and a first eccentric pin connected to said first spur gear and to said one connector plate. The height adjustment knob is connected to said first eccentric pin whereby knob rotation causes rotation of said first spur gear and corresponding rotation of said control rod sprocket relative to said track to cause vertical motion of said backrest assembly relative to said seat assembly. The backrest tilt adjustment means includes a rotatable tilt adjustment knob located at the other of said connector plates for effecting tilting movement of said backrest pan relative to said seat pan. The tilt adjustment means further includes a connector assembly connected to and tiltable in response to rotation of said tilt adjustment knob and including a pair of relatively slideable connector members, one of said connector members being connected to said backrest pan and having a slot for accommodating said control rod. The backrest tilt adjustment means also comprises a second spur gear connected to said other connector plate, a second ring gear connected to the other of said connector members and having internal teeth engaged with said second spur gear, and a second eccentric pin connected to said second spur gear and to said other connector member. The tilt adjustment knob is connected to said second eccentric pin whereby knob rotation causes rotation of said second ring gear and corresponding tilting of said backrest assembly relative to said seat assembly.

Backrest tilt adjustment means in accordance with the invention are adaptable for use with various types of seat assemblies, are relatively economical and easy to fabricate and use a minimum number of components, are reliable in use, and prevent displacement of the backrest assembly from a selected tilted position even under the application of great force.

Other objects and advantages of the invention will hereinafter appear.

BRIEF DESCRIPTION OF THE DRAWINGS

FIG. 1 is a side elevational view of a vehicle seat in accordance with the invention showing the backrest in upright position and the arm rests in upright position;

FIG. 2 is a view similar to FIG. 1 but showing the backrest tilted rearwardly and the arm rest positioned forwardly and rotated forwardly;

FIG. 5 is a bottom plan view of the vehicle seat shown in FIGS. 1-4;

FIG. 6 is a top plan view of the seat pan shown in FIG. 5;

FIG. 7 is a side elevational view partly in cross section taken on line 7—7 of FIG. 6;

FIG. 16 is a view taken on line 16—16 of FIG. 15;

FIG. 17 is a view taken on line 17—17 of FIG. 15;

FIG. 18 is like FIG. 17 but moved;

FIG. 19 is a view taken on line 19—19 of FIG. 15;

DESCRIPTION OF A PREFERRED EMBODIMENT

General Arrangement

Figure 3:
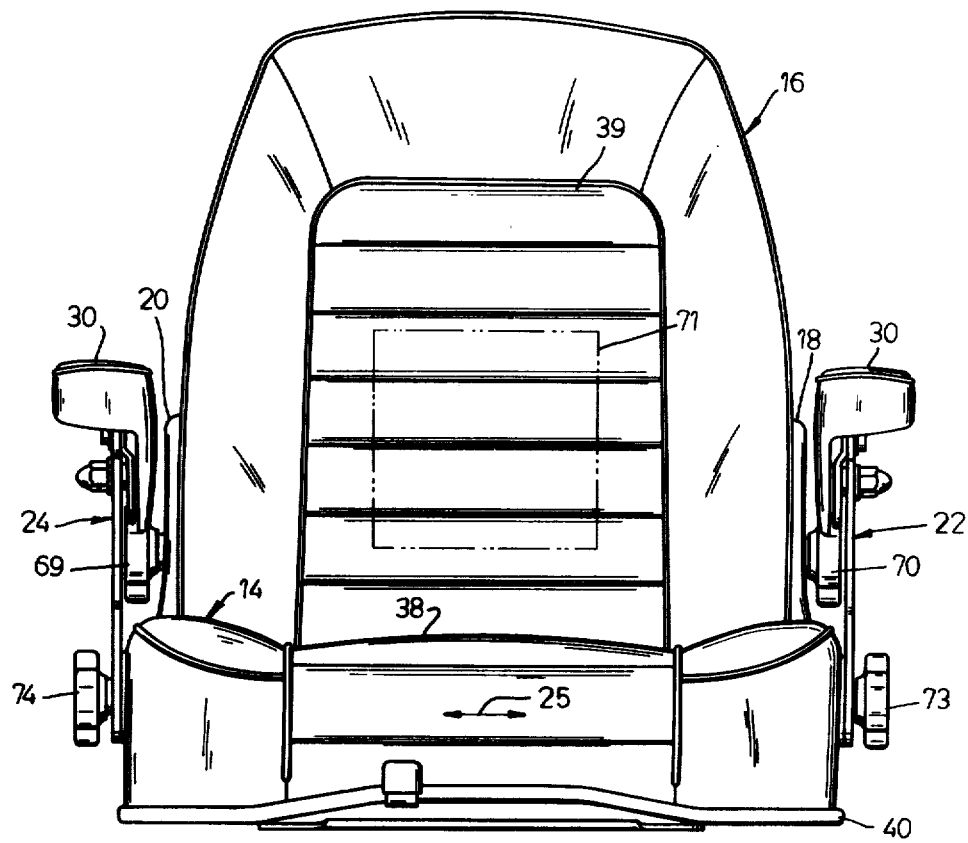
FIG. 3 is a front elevational view of the vehicle seat shown in FIG. 1.

FIGS. 1, 2, 3, and 4 show a vehicle seeat 10 in accordance with the invention mounted on a pedestal 11 (FIG. 1) which, in turn, is mounted on the floor 12 of a vehicle such as a tractor, construction machine, or the like. In the following description, the terms "left" and "right" refer to the left and right sides of the vehicle seat relative to the occupant of the seat, unless otherwise noted, and regardless of orientation of a component in a particular drawing figure.

Seat 10 comprises a seat assembly 14, a backrest assembly 16 connected to the seat assembly by a pair of stamped sheet metal L-shaped connector plates 18 (left) and 20 (right), and a pair of independently operable arm rest assemblies 22 (left) and 24 (right) connected to the connector plates 18 and 20, respectively.

Seat 10 can swivel 30° right or left for a total of 60° in the direction of the arrow 25 (FIG. 1) about a vertical axis 26 with respect to pedestal 11. Backrest assembly 16 can be tilted forward or rearward to a limited degree (about 28° total travel from the vertical in one direction) in the direction of the arrow 27 (FIG. 2) and can also be raised or lowered in the direction of the arrow 28 (FIG. 2) with respect to seat assembly 14. The arm rest 30 of each arm rest assembly 22, 24 is rotatable in a vertical plane in the direction of arrow 31 (FIG. 2) and is also shiftable upwardly and downwardly in the vertical plane in the direction of the arrows 32 (FIG. 2), as comparison of FIGS. 1 and 2 shows.

As FIGS. 1-8 show, seat assembly 14 and backrest assembly 16 generally comprise rigid stamped sheet metal frames or pans 34 and 35, respectively, shaped or contoured layers or blocks 36 and 37, respectively, of resilient compressible material, such as foam or sponge rubber or the like, for disposition on the respective pans, flexible exterior upholstery covers 38 and 39, respectively, of vinyl or the like overlying and adhering to the blocks 36 and 37, respectively, and metal edging or finishing strips 40 and 41, respectively.

As FIGS. 5, 6, and 7 best show, seat pan 34, which is generally rectangular around its periphery, comprises a downwardly concave circular central portion 43, a flat upwardly sloped rear portion 44, flat forward portions 45, a flat raised forward portion 46 having a downwardly sloped adjacent portion 47, and upwardly sloped side portions, left and right side portions 48 and 49, respectively, which terminate in integrally formed downwardly depending left and right side plates 50 and 51, respectively. Each side plate 50 and 51 is provided with a pair of spaced apart mounting holes 52.

As FIGS. 1, 2, 3, and 4 show, each connector plate 18 and 20 comprises a pair of spaced apart mounting holes 55 in its lower leg for accommodating mounting bolts 56 which extend therethrough and through the threaded mounting holes 52 in the seat pan side plates 50 and 51 to rigidly secure the connector plates 18 and 20 to the seat pan 34.

Figure 4:
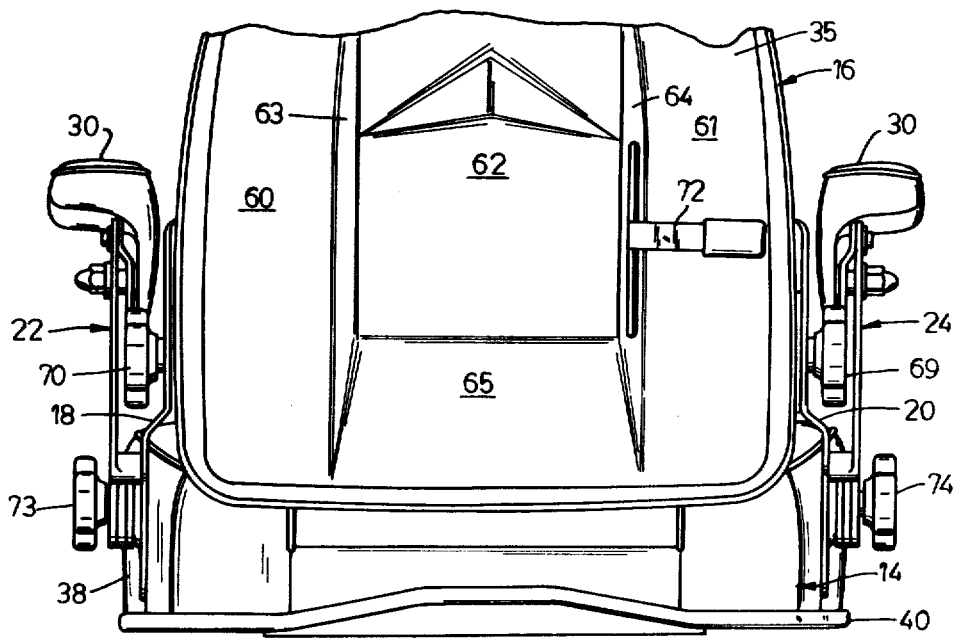
FIG. 4 is a rear elevational view of the vehicle seat shown in FIG. 1.

As FIG. 4 shows, backrest pan 35, which is generally rectangular around its periphery, comprises spaced apart slightly rearwardly curved left and right side portions 60 and 61, respectively, and a rearwardly concave rectangular central portion 62 which is bounded on its left and right edges by rearwardly sloped side portions 63 and 64, respectively, and a rearwardly sloped bottom portion 65.

The connector plates 18 and 20 have holes 67 and 68, respectively, near the upper ends thereof for control components associated with the backrest tilt adjustment means and the backrest vertical (height) adjustment means, respectively. Means are provided to connect and support the backrest assembly 16 to the connector plates 18 and 20 of the seat assembly 14 and also to enable the backrest assembly to be raised and lowered vertically to various positions and to be tilted forwardly and rearwardly to various positions relative to the seat assembly. Such means include a height adjustment knob 69 and a tilt adjustment knob 70. Means, including a control lever 72, are also provided in the backrest assembly 16 to horizontally adjust lumbar support 71 embodied therein. The backrest tilt adjustment means, the backrest vertical adjustment means, and the lumbar support adjustment means employ or embody various common elements or components. Means, including arm rest adjustment knobs 73 and 74, are provided in the arm rest assemblies 22 and 24, respectively.

BACKREST HEIGHT ADJUSTMENT MEANS

Figure 8:
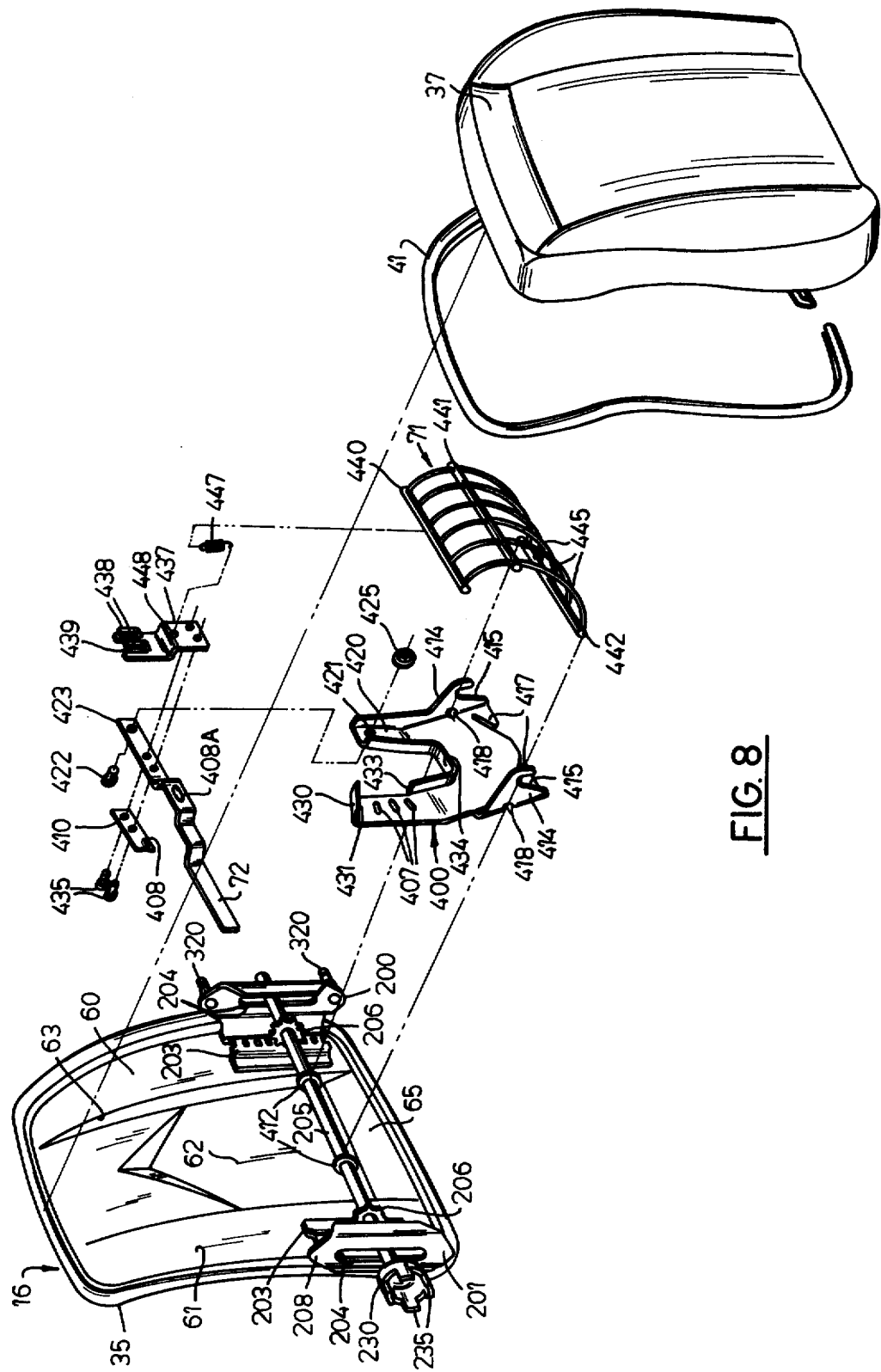
FIG. 8 is an exploded view of the backrest assembly of the vehicle seat shown in FIGS. 1-4 taken from the right side of the vehicle seat and showing a portion of the height adjustment means and the adjustable lumbar support means.
Figure 9:
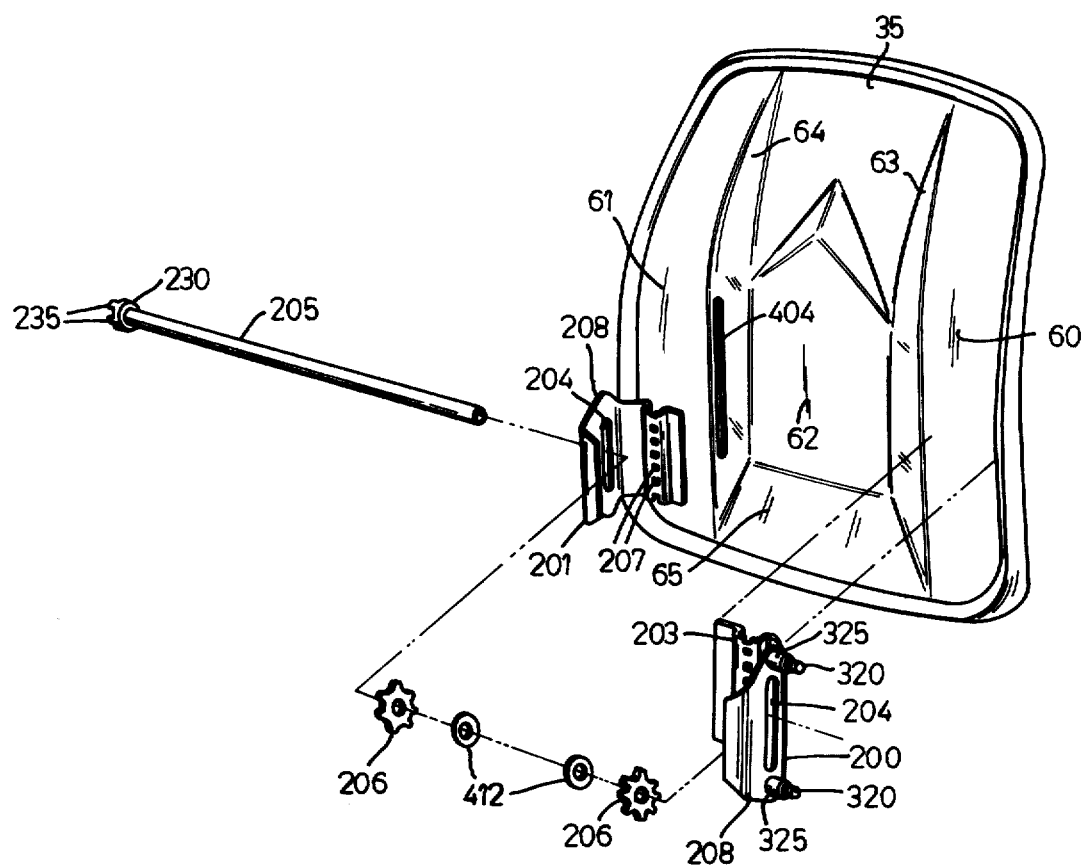
FIG. 9 is an exploded view of the backrest assembly of the vehicle seat shown in FIGS. 1-4 taken from the left side of the vehicle seat.
Figure 10:
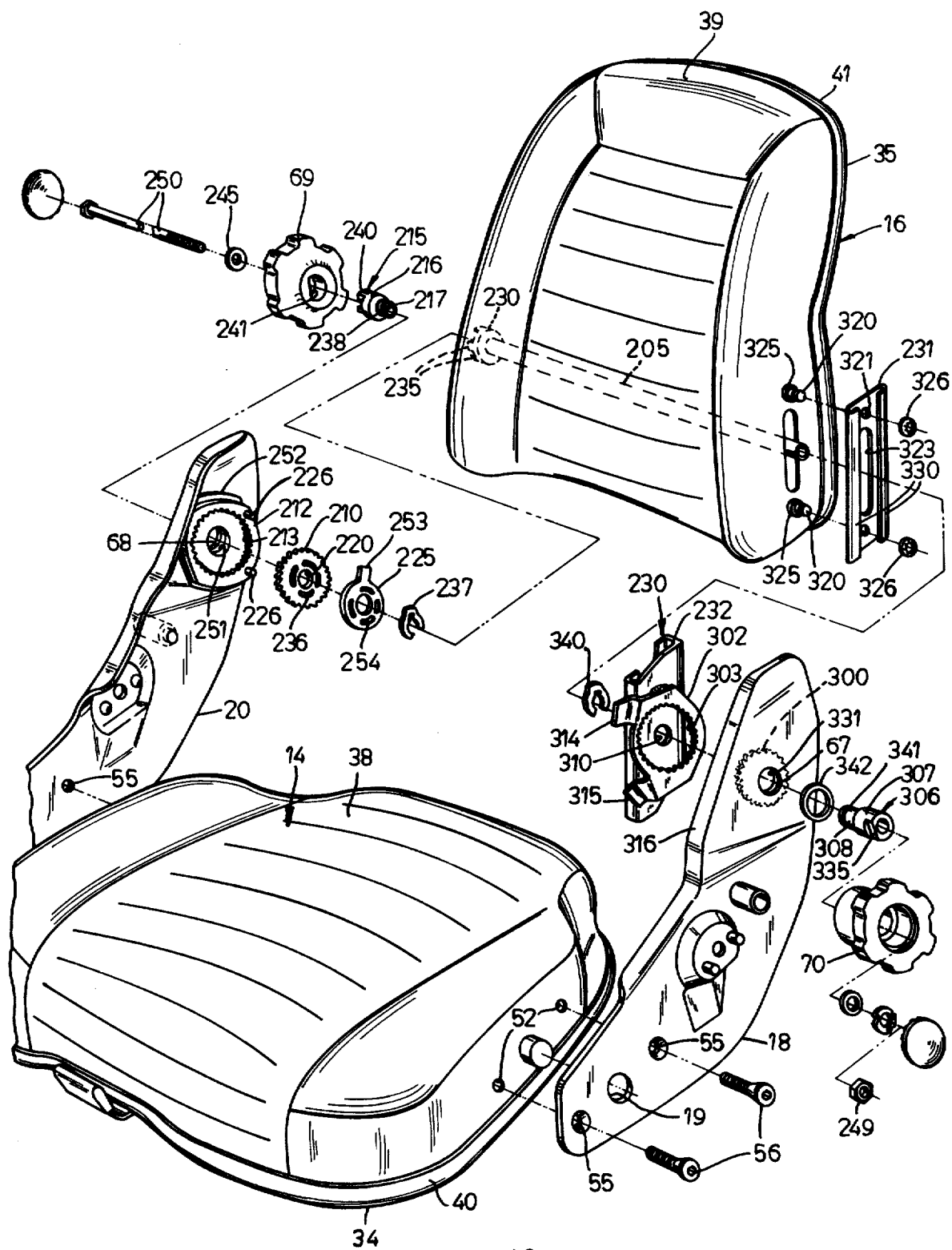
FIG. 10 is an exploded view of a portion of the vehicle seat shown in FIG. 1 taken from the left front side thereof.
Figure 12:
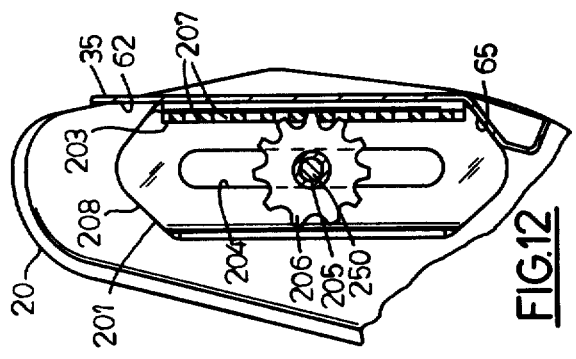
FIG. 12 is a view taken on line 12—12 of FIG. 11.
Figure 13:
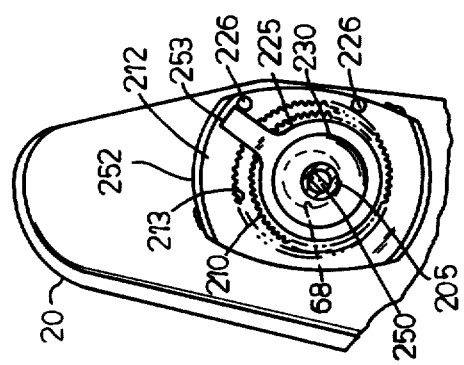
FIG. 13 is a view taken on line 13—13 of FIG. 11.
Figure 14:
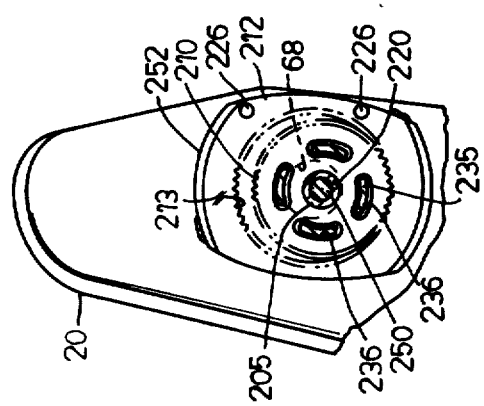
FIG. 14 is a view taken on line 14—14 of FIG. 11.
Figure 11:
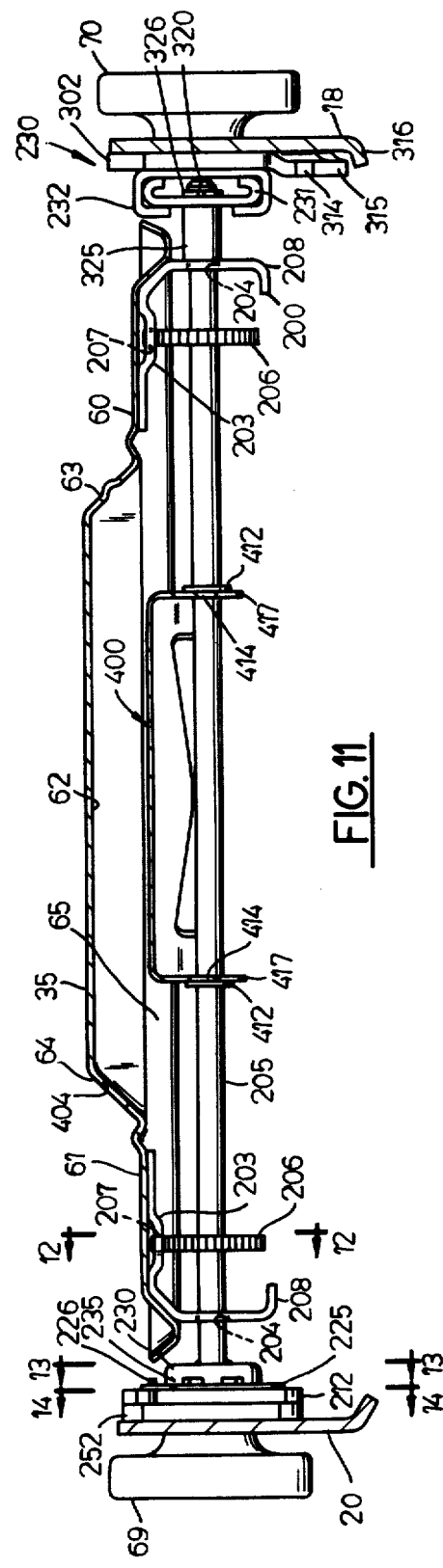
FIG. 11 is a cross-section view taken on line 11—11 of FIG. 15 of the control mechanism shown in FIGS. 8, 9, and 10.

As hereinbefore explained, and as FIGS. 8-15 show, vehicle seat 10 comprises seat pan 34, backrest pan 35, and the pair of connector plates 18 and 20 connected to opposite lateral sides of the seat pan. Backrest height adjustment means are connected between the connector plates 18 and 20 and the backrest pan 35 to enable the backrest pan to be raised or lowered vertically to desired positions relative to the seat pan 34 wherein it then becomes locked. As FIGS. 8 and 9 show, the backrest height adjustment means comprises: a pair of spaced apart brackets 200 and 201 connected to the backrest pan 35 as by welding, each having a vertical track or track portion 203 of forwardly projecting U-shaped cross section and a vertical guide slot 204, and a hollow cylindrical elongated rotatable control rod 205 extending through the guide slots 204 and having a pair of axially spaced apart track sprockets 206 fixed thereon as by welding and engaged with the vertical tracks 203. Track 203 has, for example, a plurality of vertically spaced apart tracking holes 207. Each bracket 200, 201 comprises a forwardly extending side plate 208 which has the vertical guide slot 204 therethrough for accommodating the ends of the control rod 205. As will appear, the control rod is part of the vertical adjustment means, the tilt adjustment means, and the lumbar support adjustment means. As FIG. 10 shows, planocentric gears, including a spur gear 210 fixed to one end of the control rod 205 and a ring gear 212 having internal teeth 213 engaged with the spur gear and fixed to one of the connector plates, i.e., plate 20, an eccentric pin 215 rotatable by height adjustment knob 69 located outside of the connector plate 20 and having eccentric cylindrical portions 216 and 217. Portion 217 of pin 215 is engaged with a circular hole 220 in the spur gear 210 and portion 216 of pin 215 is engaged with circular hole 68 in the connector plate 20, whereby knob rotation causes harmonic travel (oscillation) and rotation of the spur gear 210 relative to ring gear 212 and corresponding rotation of the control rod 205 and its attached sprockets 206 along the tracks 203 of the brackets 200 and 201 to cause vertical motion of the backrest pan 35. A stop member 253 on a stop plate 225 which is rotatable with the spur gear 210 is engageable with spaced apart stop pins 226 on the ring gear 212 to limit vertical travel. A slideable connection assembly 230, comprising guide plates 231 and 232, is provided between the other connector plate 18 and the backrest pan 35.

As hereinafter explained in more detail, guide plate 231 is rigidly secured to backrest pan 35 and guide plate 232 is secured relative to connector plate 18. The guide plates 231 and 232 are slideably interengaged so that, as backrest assembly 16 is raised or lowered vertically relative to the connector plates 18 and 20 (and to the seat assembly 14), the left side of the backrest assembly 16 does not bind.

Figure 15:
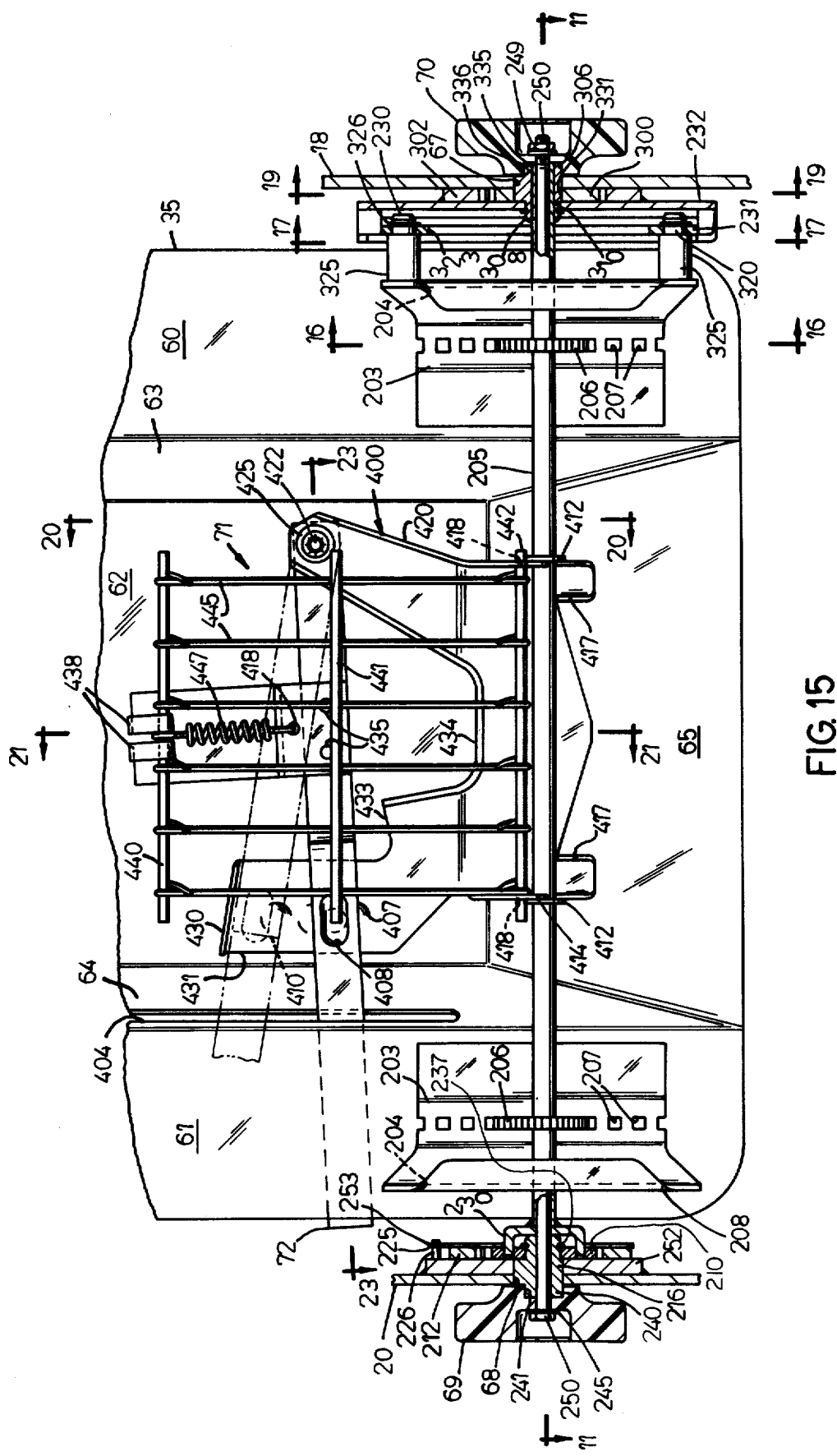
FIG. 15 is a front elevational view partly in cross section of the control assembly and lumbar support means shown in FIGS. 5 and 11.
Figure 23:
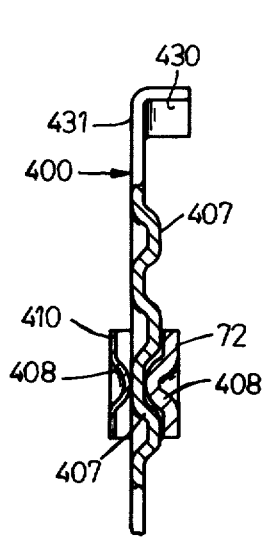
FIG. 23 is an enlarged cross-sectional view taken on line 23—23 of FIG. 22.
Figure 21:
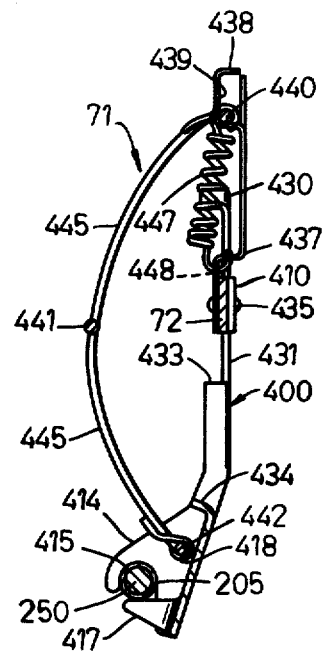
FIG. 21 is a cross-sectional view taken on line 21—21 of FIG. 15.
Figure 20:
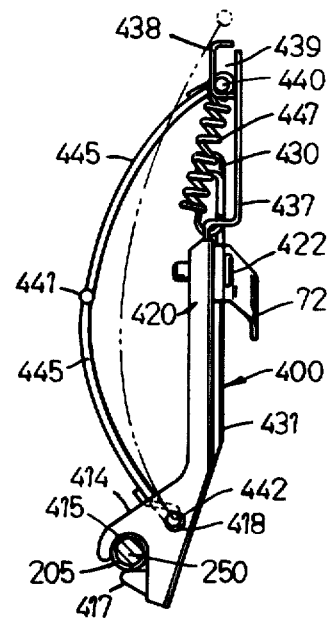
FIG. 20 is a cross-sectional view taken on line 20—20 of FIG. 15.
Figure 22:
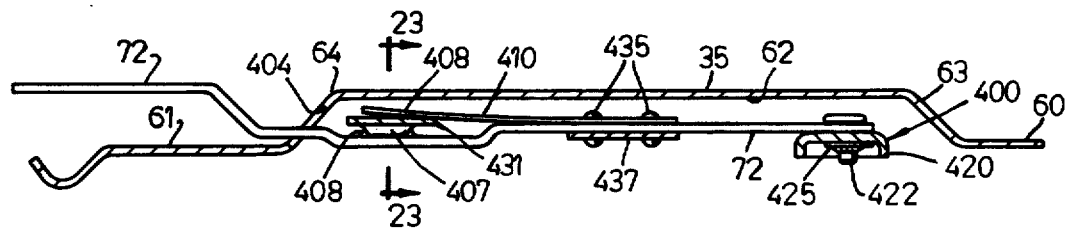
FIG. 22 is a cross-sectional view taken on line 22—22 of FIG. 15.

The backrest vertical height adjustment means, which is controlled from the right side of vehicle seat 10 by knob 69, further comprise the following components. Control rod 205 has a drive coupling 230 rigidly secured at its right end as by welding whereby the control rod can be rotated, as hereinafter explained, about its own axis in opposite directions to effect corresponding rotation of the sprockets 206 and vertical raising or lowering of backrest assembly 16 as the sprocket teeth cooperate with the tracking holes 207 to force the backrest pan 35 up or down relative to the position of the control rod. The slots 204 in the brackets 200 and 201 allow control rod 205 to rotate and also allow backrest pan 35 to move vertically relative to the control rod. As will be understood, there is also some slight oscillatory movement of control rod 205 and backrest assembly 16 as the control rod rotates about its own axis. Drive coupling 230 has four teeth 235 which engage four corresponding recesses 236 in spur gear 210. As FIG. 15 shows, spur gear 210 is secured on eccentric pin 215 against axial displacement by means of a spring steel retainer ring 237 which engages a circumferential groove 238 formed on portion 217 of the pin and spur gear 210 is relatively rotatable thereon. Eccentric pin 215 also has a non-circular portion 240 extending therefrom which is engaged in a correspondingly shaped opening 241 on the inner side of height adjustment knob 69. Thus, as FIG. 15 shows, the axis of rotation of spur gear 210 is offset from the axis of rotation of knob 69 (which latter axis is the same axis of rotation as portion 216 of eccentric pin 210). The knob 69, eccentric pin 215, and flat washers 245, are all disposed on an elongated bolt 250 which extends through control rod 205 and are secured together against axial displacement thereon by a nut 249 at the other end of the control rod 205. Portion 216 of eccentric pin 215 is rotatably mounted in the hole 68 in connector plate 20 and the hole 68 is in registry with a hole 251 in ring gear 212. Ring gear 212 is rigidly secured as by welding to the inner side of a support plate 252 which is, in turn, welded to the inner side of connector plate 20. Ring gear 212 is located so that its center point lies on the axis of rotation of knob 69 and portion 216 of eccentric pin 215, but so that its center point is offset from the axis of rotation of spur gear 210. Spur gear 210 engages ring gear 212 in such a manner that, when knob 69 is rotated, spur gear 210 is moved in a planocentric path and rotates around the ring gear 212. such planocentric motion is also accompanied by rotation of spur gear 210 about its own axis. This latter rotation, in turn, results in rotation of coupling 230, control rod 205, and sprockets 206, with resultant vertical movement (with slight oscillation also) of backrest assembly 16. The use of the aforedescribed arrangement, i.e., the eccentrically arranged spur gear 210 and ring gear 212, enables the backrest assembly 16 to be easily raised or lowered with negligible oscillation by means of rotation of knob 69 but positively locks and prevents slippage of backrest assembly 16 from a position into which it is moved, even if heavy vertical forces are imposed on backrest assembly 16. Slippage cannot occur because when a load is applied, the spur gear and the eccentric shaft tend to rotate in opposite directions relative to one another, which is impossible, and thus the unit locks.

Stop plate 225, which has an outwardly projecting stop member 253, has holes 254 whereby it is mounted on and rotatable with coupling 230, as FIGS. 10 and 15 show. The stop member 253 is engageable with a respective one of the pair of stop pins 226 which are rigidly secured to the ring gear 212 and act to limit the rotation of spur gear 210 and, consequently, the number of rotations of knob 69 so as to prevent the back pan 35 from topping out and/or bottoming out, thus causing binding when tilt adjust is operated.

BACKREST TILT ADJUSTMENT MEANS

As hereinbefore explained and as FIGS. 8–15 show, vehicle seat 10 comprises seat pan 34, backrest pan 35, and the pair of connector plates 18 and 20 connected to opposite lateral sides of the seat pan. Backrest tilt adjustment means are connected between one connector plate 18 and the backrest pan 35 to enable the backrest pan to be tilted to desired positions wherein it then becomes locked. The backrest tilt adjustment means comprises planocentric gears, including a spur gear 300 fixed to the inside of the connector plate 18 and a ring gear 302 having internal teeth 303 engaged with the spur gear and fixed to the guide plate assembly 230 on the backrest pan 35. An eccentric pin 306 is rotatable by the tilt adjustment knob 70 located outside of the connector plate 18 and has two relatively eccentric cylindrical portions 307 and 308 thereon. Portion 308 of pin 306 is engaged with circular hole 310 in guide plate 232 of the slideable connection asssmbly 230 which is connected to backrest pan 35. Portion 307 of pin 306 is engaged with circular hole 67 in the connector plate 18 and with circular hole 331 in spur gear 300, whereby knob rotation causes harmonic travel (oscillation) and rotation of the ring gear 302 and corresponding tilting motion of the backrest pan 35 and backrest assembly 16. Stop projections 314 and 315 on the ring gear 302 are engageable with a flange 316 on the connector plate 18 to limit tilting. A pivotal connection, including components of the backrest height adjustment means hereinbefore described, is provided between the other connector plate 20 and the backrest pan 35.

The backrest tilt adjustment means, which is controlled by the knob 70 on the left side of vehicle seat 10, is specifically constructed as follows. Thus, as FIGS. 8, 9, 10, 11 and 15 show, left bracket 200 on backrest pan 35 has upper and lower outwardly extending pins 320 which are used to support the first vertical guide plate 231 which is located on the outer left side of backrest assembly 16. Guide plate 231 has upper and lower pin-receiving holes 321 for the pins 320 and also has a vertical slot 323 for accommodating the left end of control rod 205. The pins 320 carry or embody cylindrical spacers or bushings 325 and the guide plate 231 is secured thereagainst by retainer rings 326. The guide plate 231, which has inwardly bent vertical edges 330, is slideably or telescopically receivable within and relatively movable vertically with respect to the correspondingly shaped but slightly larger second guide plate 232. The guide plates 231 and 232 slideably cooperate to form the assembly 230 to permit and guide vertical movement of the backrest assembly 16 relative to the seat assembly 14 (and to the connector plates 18 and 20) but also serve as a means whereby tilting or pivoting motion is transmitted to backrest pan 35. Second guide plate 232 is welded to the inner side of the ring gear 302. Ring gear 302 engages spur gear 300 which is rigidly secured as by welding to the inner side of left connector plate 18. Spur gear 300 has a centrally located hole 331 which registers with the circular hole 67 in connector plate 18. Second guide plate 232 is provided with circular hole 310 which has a center point which is out of registry with the center point of the holes 331 and 67. The hole 310 in second guide plate 232, to which ring gear 302 is attached, accommodates the cylindrical portion 308 of eccentric pin 306 which is rotatable therein. Eccentric pin 306 also has a non-circular portion 335 extending therefrom which is engaged in a correspondingly shaped opening 336 on the inner side of tilt adjustment knob 70. Thus, the axis of rotation of ring gear 302 is offset from the axis of rotation of knob 70 (which latter axis is the same axis of rotation as portion 308 of eccentric pin 306). The knob 70 is secured to eccentric pin 306 by bolt 250 and nut 249. The second guide plate 232 is secured on portion 308 of eccentric pin 306 against relative axial displacement by a press-on washer 340 which engages a circumferential groove 341 on the portion 308. A wave washer 342 is located on eccentric pin 306 against the outside of connector plate 18. Ring gear 302 engages spur gear 300 in such a manner that, when knob 70 and pin 306 are rotated, ring gear 302 (and the guide plate assembly 230 and backrest assembly 16 connected thereto) is moved in a planocentric path relative to spur gear 300 and is also caused to rotate on its own axis relative to the spur gear 300. Such rotation of ring gear 302 about its own axis imparts a tilting motion (with a slight oscillation also) to backrest assembly 16. The use of the aforedescribed arrangement, i.e., the eccentrically arranged spur gear 300 and ring gear 302, enables the backrest assembly 16 to be easily tilted forward or backward with negligible oscillation by means of rotation of knob 70 but positively locks and prevents slippage of backrest assembly 16 from a position into which it is tilted, even if heavy forces are imposed in a tilt direction on backrest assembly 16. Slippage cannot occur because the spur gear and the eccentric shaft tend to rotate in opposite directions relative to one another, which is mechanically impossible, and thus the unit locks.

Ring gear 302 has a pair of forwardly projecting spaced apart upper and lower stop members or projections 314 and 315, respectively, which are alternately engageable with the back side of edge flange 316 on connector plate 18 and act to limit the degree of rotation of ring gear 302 and to limit the number of rotations of knob 70 so as to limit the amount of tilt in the forward or rearward direction of backrest assembly 16, as FIGS. 16-19 show.

LUMBAR SUPPORT AND ADJUSTMENT MEANS

As hereinbefore explained and as FIGS. 8, 11, 15, 20, 21, 22, and 23 show, the vehicle seat backrest assembly 16 comprises the backrest pan 35, the control rod 205 in front of the pan, and the resilient sponge rubber pad 37 overlying the control rod and pan. The adjustable lumbar support means between the resilient pad 37 and backrest pan 35 comprises a support frame 400 mounted on the rod 205, the manually operable adjustment lever 72 pivotally connected to the support frame and extending across the frame and out through a slot 404 in the backrest pan 35, a lumbar support member 71 in the form of a generally rectangular resilient flexible forwardly convex grid having its lower edge connected to the support plate 400 and having its upper edge connected to the lever 72, whereby raising or lowering of the lever 72 causes a decrease or increase, respectively, in the convexity of the lumbar support member 71 and a portion of the overlying backrest pad 37. Interengageable bosses 407 on the frame and a boss 408 on the lever 72 and biasing means 410 maintain the lever in selected positions.

The lumbar support adjustment assembly which is controlled from the right rear side of vehicle seat 10 by lever 72, specifically comprises the following components. Thus, control rod 205 has a pair of axially spaced apart positioning or locator rings 412 rigidly secured thereto as by welding and located between the sprockets 206. The rigid support frame 400 formed of stamped sheet metal is pivotally mounted on control rod 205 between the locator rings 412 which prevent axial displacement thereof. Frame 400 takes the form of a plate having outer flanges 414 extending forwardly from the outside edges of the plate and provided with semi-circular notches 415 on the bottom sides thereof for receiving the control rod 205. Frame 400 also has inner triangular flanges 417 bent forwardly, as in FIG. 15, and below the control rod 205 to prevent the frame 400 from becoming disengaged from the control rod. The outer flanges 414 are also provided with holes 418 therethrough for supporting the lower end of lumbar support member 71 hereinafter described. Frame 400 has an upwardly extending left arm 420 having a hole 421 therethrough for receiving a pivot pin 422 which extends through a hole 423 in the operating lever 72 and pivotally secures the inner end of the operating lever 72 of the lumbar support frame. A press-on washer 425 is provided on pin 422 to secure it in place. Lever 72 extends through vertical slot 404 in backrest pan 35 so that the outer end thereof is accessible for adjusting movement. Lever 72 is pivotable in a generally vertical plane and its upward travel is limited by a forwardly extending stop flange 430 located at the top of an upwardly extending right arm 431 on plate 400. Downward travel of lever 72 is limited by an end 433 of a forwardly extending stiffening flange 434 along the upper indented edge of plate 400. Lever 72 is locatable at any one of a plurality of positions between its extreme upper and lower positions by means of the forwardly extending vertically spaced apart bosses 407 formed in the upwardly extending right arm 431 of plate 400, which bosses define slots therebetween for releasably engaging the forwardly extending boss 408 formed in a strip or member 410 of spring steel which is secured to the rear of lever 72 by rivets 435 and extends behind the right arm 431 of plate 400. A rearwardly extending boss 408A is also provided in lever 72. Strip 410 cooperates with lever 72 to guide the lever and also serves as a biasing means to help maintain the lever in positions wherein it is located by the bosses 408, 408A and 407. The rivets 435 also secure an upwardly extending mounting bracket 437 on the lever 72 and the bracket 437 has a pair of laterally spaced apart forwardly extending tabs 438 which define slots 439 therebehind for supporting the upper end of the lumbar support 71. Lumbar support 71, which is a preformed and preshaped assembly fabricated of strong, flexible, resilient stranded material such as PERMAMESH ®, comprises three horizontal generally parallel vertically spaced apart cross members, including an upper cross member 440, an intermediate cross member 441 and a lower cross member 442. Lumbar support 71 further comprises a plurality of (six) vertical generally parallel horizontally spaced apart vertical members 445. Each vertical member 445 is connected at its upper and lower ends to the upper and lower cross members 440 and 442, respectively, as by twisting and suitable adhesive, as FIG. 15 shows, and is also connected as by a suitable adhesive to intermediate cross member 441. Upper cross member 440 of the lumbar support 71 is engaged in the slots defined by the tabs 438 in mounting bracket 437 on lever 72 and lower cross member 442 has its ends extending through the holes 418 in the outer flanges 414 of support frame 400. A helical tension spring 447 has its upper end engaged with or hooked over cross bar 440 in the space between the tabs 438 and has its lower end engaged with or hooked in a hole 448 near the lower end of the mounting bracket 437. Spring 447 serves as a biasing means to preserve the convexity of the lumbar support 71 and is firmly engaged with the mounting bracket 437 as the latter moves up and down with lever 72. Lumbar support 71 and its associated components is located between backrest pan 35 and the layer 37 of resilient material in backrest assembly 16. When lever 72 is in its lowermost position (FIG. 20, solid lines), the upper and lower cross members 440 and 442, respectively, are relatively close together and the vertical members 445 curve or bulge forwardly to their greatest extent, correspondingly shaping the resilient layer 37. When lever 72 is in an intermediate or uppermost position (FIG. 20, phantom lines), upper and lower cross members 440 and 442, respectively, are spaced farther apart and the forward bulge of the vertical members 445 is reduced. The lumbar support 71 is attached to control rod 205 and thus remains at substantially the same distance above seat assembly 14 even though backrest assembly 16 is raised or lowered or tilted, thereby maintaining a constant vertical position relative to the lumbar region of the back of a seat occupant.

As will be understood, when loading the lumbar support 71 excessively, the cross member 440 slides upwardly in slot 439, thereby allowing the support 71 to flatten out somewhat. When the load is removed, the extension spring 447 acts to return the support 71 back to its originally adjusted bulge.

We claim:

1. In a vehicle seat:
a seat assembly including a seat pan;
a backrest assembly including a backrest pan;
backrest height adjustment means connected between said seat pan and said backrest pan and including a height adjustment knob and means for locking said backrest pan at a predetermined height;
and backrest tilt adjustment means connected between said seat pan and said backrest pan and including a tilt adjustment knob and means for locking said backrest pan at a predetermined tilt;
said tilt adjustment means further including a connector assembly connected to and tiltable in response to rotation of said tilt adjustment knob and including a pair of relatively slideable connector members, one of said connector members being connected to said tilt adjustment knob and the other of said connector members being connected to said backrest pan;
whereby said backrest pan can be tilted regardless of the vertical position relative to said seat pan wherein it is locked and can be moved vertically regardless of the tilted position relative to said seat pan wherein it is locked.

2. A vehicle seat according to claim 1 wherein said height adjustment means and said tilt adjustment means include means to limit vertical and tilting movement, respectively, of said backrest pan.

3. In a vehicle seat:
a seat assembly including a seat pan;
a backrest assembly including a backrest pan;
backrest height adjustment means connected between said seat pan and said backrest pan;
and backrest tilt adjustment means connected between said seat pan and said backrest pan;
said height adjustment means including a rotatable height adjustment knob located at one side of said seat pan for effecting vertical movement of said backrest pan relative to said seat pan;
said height adjustment means further including a control rod rotatable in response to rotation of said height adjustment knob and having a sprocket thereon engageable with a track on said backrest pan;
said tilt adjustment means including a rotatable tilt adjustment knob located at the other side of said seat pan for effecting tilting movement of said backrest pan relative to said seat pan;
said tilt adjustment means further including a connector assembly connected to and tiltable in response to rotation of said tilt adjustment knob and including a pair of relatively slideable connector members, one of said connector members being connected to said tilt adjustment knob and the other of said connector members being connected to said backrest pan;
whereby said backrest pan can be tilted regardless of its vertical position relative to said seat pan and can be moved vertically regardless of its tilted position relative to said seat pan.

4. A vehicle seat according to claim 3 wherein said height adjustment means and said tilt adjustment means include means to limit vertical and tilting movement, respectively, of said backrest pan.

5. A vehicle seat according to claim 3 including connector plates on opposite sides of said seat pan and wherein said backrest height adjustment means further comprises a first spur gear connected to said control rod, a first ring gear connected to one of said connector plates and having internal teeth engaged with said first spur gear, a first eccentric pin connected to said first spur gear and to said one connector plate;
said height adjustment knob being connected to said first eccentric pin whereby knob rotation causes rotation of said first spur gear and corresponding rotation of said control rod sprocket relative to said track to cause vertical motion of said backrest assembly relative to said seat assembly;
and wherein said backrest tilt adjustment means comprises a second spur gear fixed to the other of said connector plates, a second ring gear connected to said one connector member of said connector assembly and having internal teeth engaged with said second spur gear, and a second eccentric pin connected to said second spur gear and to said other connector plate, said tilt adjustment knob being connected to said second eccentric pin whereby knob rotation causes rotation of said second ring gear and corresponding tilting of said backrest assembly relative to said seat assembly.

6. In a vehicle seat:

a seat assembly including a seat pan;

a pair of connector plates connected near opposite sides of said seat pan;

a backrest assembly including a backrest pan;

backrest height adjustment means connected between one of said connector plates and said backrest pan;

and backrest tilt adjustment means connected between the other of said connector plates and said backrest pan;

said backrest pan being tiltable regardless of its vertical position relative to said seat pan and being movable vertically regardless of its tilted position relative to said seat pan;

said backrest height adjustment means including at least one bracket connected to said backrest pan and comprising a vertical track and a vertical slot, a rotatable height adjustment knob located at said one connector plate for effecting vertical movement of said backrest pan relative to said seat pan;

said height adjustment means further including a control rod extending through said vertical slot in said bracket and rotatable in response to rotation of said height adjustment knob and having a sprocket thereon engageable with said vertical track on said bracket;

said backrest height adjustment means further comprising a first spur gear connected to said control rod, a first ring gear connected to said one connector plate and having internal teeth engaged with said first spur gear, a first eccentric pin connected to said first spur gear and to said one connector plate;

said height adjustment knob being connected to said first eccentric pin whereby knob rotation causes rotation of said first spur gear and corresponding rotation of said control rod sprocket relative to said track to cause vertical motion of said backrest assembly relative to said seat assembly;

said backrest tilt adjustment means including a rotatable tilt adjustment knob located at the other of said connector plates for effecting tilting movement of said backrest pan relative to said seat pan;

said tilt adjustment means further including a connector assembly connected to and tiltable in response to rotation of said tilt adjustment knob and including a pair of relatively slideable connector members, one of said connector members being connected to said backrest pan and having a slot for accommodating said control rod;

said backrest tilt adjustment means also comprising a second spur gear connected to said other connector plate, a second ring gear connected to the other of said connector members and having internal teeth engaged with said second spur gear, a second eccentric pin connected to said second spur gear and to said other connector member;

said tilt adjustment knob being connected to said second eccentric pin whereby knob rotation causes rotation of said second ring gear and corresponding tilting of said backrest assembly relative to said seat assembly.

7. In a vehicle seat:

a seat assembly including a seat pan;

a pair of connector plates connected near opposite sides of said seat pan;

a backrest assembly including a backrest pan;

backrest height adjustment means connected between one of said connector plates and said backrest pan;

and backrest tilt adjustment means connected between the other of said connector plates and said backrest pan;

said backrest pan being tiltable regardless of its vertical position relative to said seat pan and being movable vertically regardless of its tilted position relative to said seat pan;

said backrest height adjustment means including a pair of brackets connected near opposite sides of said backrest pan, and each bracket comprising a vertical track and a vertical slot, a rotatable height adjustment knob located at said one connector plate for effecting vertical movement of said backrest pan relative to said seat pan;

said height adjustment means further including a control rod extending through the vertical slots in said brackets and rotatable in response to rotation of said height adjustment knob and having sprockets thereon engageable with the vertical tracks on said brackets;

said backrest height adjustment means further comprising a first spur gear connected to said control rod, a first ring gear connected to said one connector plate and having internal teeth engaged with said first spur gear, a first eccentric pin connected to said first spur gear and to said one connector plate;

said height adjustment knob being connected to said first eccentric pin whereby knob rotation causes rotation of said first spur gear and corresponding rotation of said control rod sprockets relative to said tracks to cause vertical motion of said backrest assembly relative to said seat assembly;

said backrest tilt adjustment means including a rotatable tilt adjustment knob located at the other of said connector plates for effecting tilting movement of said backrest pan relative to said seat pan;

said tilt adjustment means further including a connector assembly connected to and tiltable in response to rotation of said tilt adjustment knob and including a pair of relatively slideable connector members, one of said connector members being connected to one of said brackets and having a slot for accommodating said control rod;

said backrest tilt adjustment means also comprising a second spur gear connected to said other connector plate, a second ring gear connected to the other of said connector members and having internal teeth engaged with said second spur gear, a second eccentric pin connected to said second spur gear and to said other connector member;

said tilt adjustment knob being connected to said second eccentric pin whereby knob rotation causes rotation of said second ring gear corresponding tilting of said backrest assembly relative to said seat assembly.

8. A vehicle seat according to claim 7 including a first stop member on said first spur gear engageable with second stop members on said first ring gear to limit vertical travel, and further including a third stop member on said other connector plate and fourth stop members on said second ring gear engageable with said third stop member to limit tilting.

* * * * *